US006751788B1

United States Patent
Göser

(10) Patent No.: US 6,751,788 B1
(45) Date of Patent: Jun. 15, 2004

(54) METHOD OF TESTING COMPUTER SOFTWARE

(75) Inventor: Gerhard Göser, Pentling (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/553,326

(22) Filed: Apr. 20, 2000

(30) Foreign Application Priority Data

Apr. 20, 1999 (EP) .............................................. 99107827

(51) Int. Cl.$^7$ ................................................. G06F 9/44
(52) U.S. Cl. ........................ 717/127; 717/124; 717/131; 714/30; 714/34; 714/37; 714/47; 712/40; 712/244
(58) Field of Search ................................. 717/124–161; 714/703, 724, 715, 27, 30, 34, 37, 47, 716, 726; 712/40, 244

(56) References Cited

U.S. PATENT DOCUMENTS

| | | | | | |
|---|---|---|---|---|---|
| 5,450,575 | A | * | 9/1995 | Sites .......................... | 717/128 |
| 5,761,408 | A | * | 6/1998 | Kolawa et al. ............. | 717/124 |
| 5,872,909 | A | * | 2/1999 | Wilner et al. ............... | 717/131 |
| 6,223,144 | B1 | * | 4/2001 | Barnett et al. .............. | 703/22 |
| 6,247,144 | B1 | * | 6/2001 | Marcias-Garza et al. ..... | 714/25 |
| 6,477,683 | B1 | * | 11/2002 | Killan et al. .................. | 716/1 |
| 6,484,188 | B1 | * | 11/2002 | Kwong et al. .............. | 707/206 |

OTHER PUBLICATIONS

Testing computer Software, Cem Kaner et al. © 1999, p. 56.*
"Experiments With A Program Timing Tool Based On Source–Level Timing Schema", ChangYun Park et al., CH2933–0/90/0000/0072, IEEE, 1990, pp. 72–81.
"AIDA—A Dynamic Data Flow Anomaly Detection System for Pascal Programs", Fun Ting Chan et al., Software Practice & Experience, Mar. 1987, No. 3, Chichester, Sussex, Great Britain, pp. 227–239.

* cited by examiner

Primary Examiner—Tuan Dam
Assistant Examiner—Chuck Kendall
(74) Attorney, Agent, or Firm—Laurence A. Greenberg; Werner H. Stemer; Ralph E. Locher

(57) ABSTRACT

A method of testing the ability of software modules, each executing particular functions, in a device to cooperate using machine code sequences contained in executing software modules, checks the mutual independence and compatibility of the various technical functions. The method includes searching software modules for machine code sequences containing write access to unauthorized areas, ascertaining a respective maximum number of loop passes for each loop and establishing whether or not the respective maximum number of loop passes is limited, and, if reference values are observed, determining that the software modules are able to cooperate, and, if the reference values are not observed, determining that the software modules are not able to cooperate.

13 Claims, 3 Drawing Sheets

METHOD OF TESTING COMPUTER SOFTWARE

BACKGROUND OF THE INVENTION

Field of the Invention

The invention relates to a method of testing computer software.

Software and sections of software (called software modules below) are presently frequently written by more than one person. It is, therefore, necessary to ensure that the actions of one software module do not contradict, or even reverse, those of another software module. In the case of open software, that is to say, in the environment of a personal computer, the mutual independence and compatibility of the software modules is guaranteed by dynamic area monitoring software.

For software embedded in devices (with microcontrollers, microprocessors, or controllers, for example), the compatibility is currently ensured by rules for the cooperation of individual software modules: the software is first produced in readable form as source code with the associated documentation. The software is then compiled into the machine-readable form, the object code. A company's in-house task division and rules (design rules) ensure that the individual software modules are compatible with one another. The interaction of the software modules in terms of function and timing is checked in an integration test.

In the case of embedded software, all these operations are carried out with the open cooperation of all those involved, that is to say, with the source codes and their documentation at hand.

Embedded software modules executing cooperative functions between two or more devices have become so complex that they can no longer be mastered or produced by individual firms alone. It has become necessary for competitors to cooperate in producing the embedded software for one or more devices. However, the competitive situation between the firms forbids the disclosure of the source code and necessitates that object code that is already compiled be embedded. Consequently, the content of a technical function is no longer known in detail to the producer of another function. The producer, therefore, can no longer take the content into account.

For a software module to perform its technical functions independently of and compatibly with another technical function, an additional area monitoring function would need to be installed. However, such installation is relatively complex, and, hence, expensive.

Software tools exist that can check that formal rules (design rules) in the source code or in the object code are being observed. There are also mechanisms for worst-case prediction of the time response using the source code or object code. However, there is no method for checking the mutual independence and compatibility of various technical functions implemented by software.

SUMMARY OF THE INVENTION

It is accordingly an object of the invention to provide a method of testing computer software that overcomes the hereinafore-mentioned disadvantages of the heretofore-known devices and methods of this general type and that checks the mutual independence and compatibility of various technical functions implemented by software.

With the foregoing and other objects in view, there is provided, in accordance with the invention, a method of testing the ability of software modules, each executing particular functions, in a device to cooperate using machine code sequences contained in executing software modules, including searching software modules for machine code sequences containing write access to unauthorized areas, ascertaining a respective maximum number of loop passes for each loop and establishing whether or not the respective maximum number of loop passes is limited, and if reference values are observed, determining that the software modules are able to cooperate, and, if the reference values are not observed, determining that the software modules are not able to cooperate.

One advantage of the invention is that no additional complexity (random access memory, read-only memory, run time) is required in the controller itself. The reduction in complexity is achieved, in particular, by the measures described below, where it is merely necessary to know the division of the technical functions between the individual software modules. Division of technical functions should be understood, for example, as meaning (1) which actuators, sensors and so on attend to which function through which ports, (2) which registers (e.g., for basic settings of the microcontroller, the microprocessor, or the controller) are attended to by which function, (3) how much run time should be available for the respective functions, (4) how frequently interrupts, preemptions and task calls will arise per unit of time, and (5) which interfaces use the functions amongst one another.

The method according to the invention for formally checking and testing software modules that are to be embedded, and appropriate complete software that is embedded, provides for the properties of the individual software modules, in terms of delimitation from the other software modules, to be formally checked statically and quasi-dynamically (meaning static worst-case consideration of the dynamic response), and for carrying out the check even before the device is in dynamic operation. The result of the check is that, advantageously, no additional monitoring software is required in active operation.

Another advantage provided is that a serviceable general technical set of functions is ensured for devices with embedded software, particularly in applications in which sections of the software are not in the form of source code. In such a case, the formal check on the delimitation of the software modules relates at least (but no exclusively) to checking prohibited write access operations to memories (for example, to registers, random access memory areas, pins, pointers, etc.) and to checking the limitation of loop counters (for example, that there are no endless loops). It is also possible to check whether or not prohibited interrupt-enable/disable operations are being carried out.

As part of the function check, provision can also be made for (1) carrying out a check, based on the object code, to determine whether or not program sections are executed directly from the random access memory area (that is to say can be changed dynamically), (2) using the object code to check the maximum length of time for which an interrupt is disabled, (3) using the object code to check the maximum amount of time a software module (task) needs for processing, (4) for the object code for an implementation language (such as OSEK-OIL), particularly, the description of the task priorities, preemptions and so on, and using the indication of the task activation frequency to determine the worst-case time response of all or a subset of the software modules, and (5) ascertaining the stack size from the worst-case situation with regard to interrupts, preemptions, etc., and their priority and frequency.

In accordance with another mode of the invention, the software modules are searched for sequences in which unauthorized interrupt-enable/disable operations are carried out, and, if the reference values are observed, it is determined that the software modules are able to cooperate, and, if the reference values are not observed, it is determined that the software modules are not able to cooperate.

In accordance with a further mode of the invention, the interrupt-disable times are ascertained and the interrupt-disable times are compared with respectively appropriate reference values, and, if the reference values are observed, it is determined that the software modules are able to cooperate, and, if the reference values are not observed, it is determined that the software modules are not able to cooperate.

In accordance with an added mode of the invention, a maximum run time of the individual executing software modules is ascertained and the maximum run time of the individual executing software modules is compared with respectively appropriate reference values, and, if the reference values are observed, it is determined that the software modules are able to cooperate, and, if the reference values are not observed, it is determined that the software modules are not able to cooperate.

In accordance with an additional mode of the invention, a total run time and a message latency time is ascertained and the total run time and the message latency time is compared with respectively appropriate reference values, and, if the reference values are observed, it is determined that the software modules are able to cooperate, and, if the reference values are not observed, it is determined that the software modules are not able to cooperate.

In accordance with yet another mode of the invention, a maximum interrupt and preemption depth is ascertained and the maximum interrupt and preemption depth is compared with respectively appropriate reference values, and, if the reference values are observed, it is determined that the software modules are able to cooperate, and, if the reference values are not observed, it is determined that the software modules are not able to cooperate.

In accordance with yet a further mode of the invention, the ascertaining step includes ascertaining the number of loop passes by identifying the loops and their associated loop counters, establishing how the counters are manipulated, and establishing whether or not the counters each have a static limit at the start of the loop.

In accordance with yet an added mode of the invention, the ascertaining interrupt-disable times step includes ascertaining the interrupt-disable times by searching the software modules for machine code sequences manipulating interrupt-enable/disable code, and determining times between each of these machine code sequences.

In accordance with yet an additional mode of the invention, the ascertaining a maximum run time step includes ascertaining the maximum run time of the individual executing software modules using a number of machine cycles.

In accordance with again another mode of the invention, the ascertaining a total run time and a message latency time step includes ascertaining the total run time and the message latency time by determining a frequency of interrupts, task calls, and messages per defined unit of time, and establishing priorities for the tasks, the messages, and permitted preemptions.

In accordance with again a further mode of the invention, the ascertaining a maximum interrupt and preemption depth step includes ascertaining the maximum interrupt and preemption depth by determining a frequency of interrupts, task calls, and messages per defined unit of time, and establishing priorities for the tasks, the messages, and permitted preemptions.

In accordance with again an added mode of the invention, a size of a required stack is ascertained from the maximum interrupt and preemption depth.

In accordance with a concomitant mode of the invention, the software modules are examined to determine whether or not machine code sequences are executed directly from a direct access memory.

Other features that are considered as characteristic for the invention are set forth in the appended claims.

Although the invention is illustrated and described herein as embodied in a method of testing computer software, it is nevertheless not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF PREFERRED EMBODIMENTS

Figure 1:
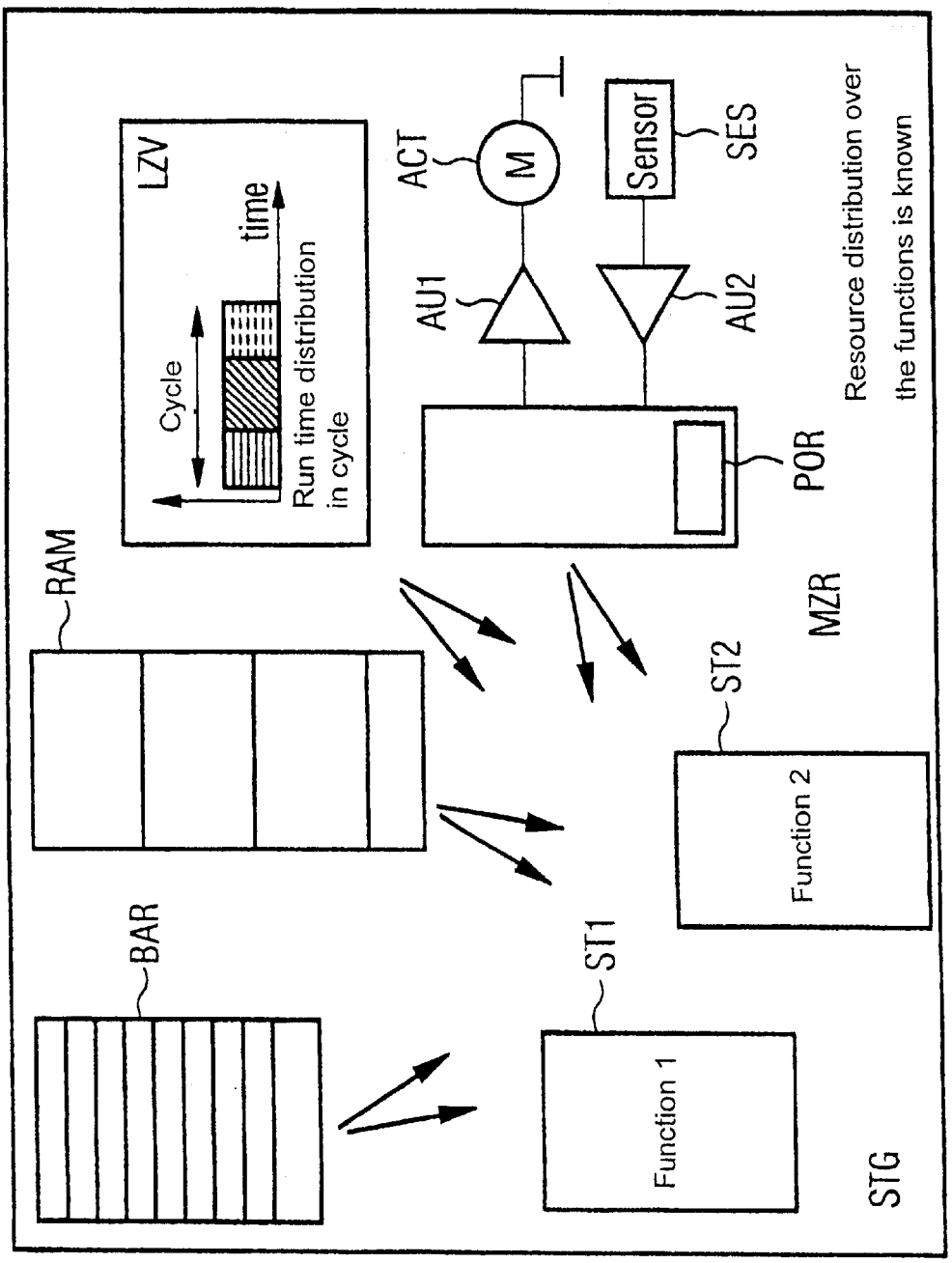
FIG. 1 is a diagrammatic illustration of the environment for using the method according to the invention.

In all the figures of the drawing, sub-features and integral parts that correspond to one another bear the same reference symbol in each case.

Referring now to the figures of the drawings in detail and first, particularly to FIG. 1 thereof, there are shown two functions to be implemented within a controller STG by software tasks ST1 and ST2 (software modules). The two software tasks ST1 and ST2 are executed in a non-illustrated processor that accesses a base register BAR, a random access memory RAM, and ports POR under the two software tasks ST1 and ST2. The ports POR are connected, for example, to a sensor SES and to an actuator ACT, with adapting units AU1 and AU2 connected in between. In the configuration, the sensor SES passes information to the processor, which processes the information using the software tasks ST1 and ST2 and controls the actuator ACT accordingly. For each cycle (for example, the minimum time interval between particular external events, such as the top dead center in an internal combustion engine), the run time is distributed over particular functions in line with a run time distribution LZV, with base register BAR, a random access memory RAM, and the ports POR being accessed on the general basis of a particular resource distribution MZR.

In particular, the division of the technical functions between the individual software tasks ST1 and ST2 is known. In the context, division of technical functions should be understood as meaning which function is attended to by the actuator ACT and which function is attended to by the sensor SEN through which port POR. It is also known which registers (for example, for basic settings of the processor, and, hence, of the controller STG) can be attended to by which function (software tasks ST1 and ST2), and how much run time (run time distribution LZV) is intended to be available for the respective functions (software tasks ST1 and ST2). Finally, it is known how frequently interrupts, preemptions, and task calls will arise per unit of time, and which interfaces use the functions amongst one another (for example, "send-message instructions" or "receive-message instructions" in the machine language OSEK OIL).

Figure 2A:
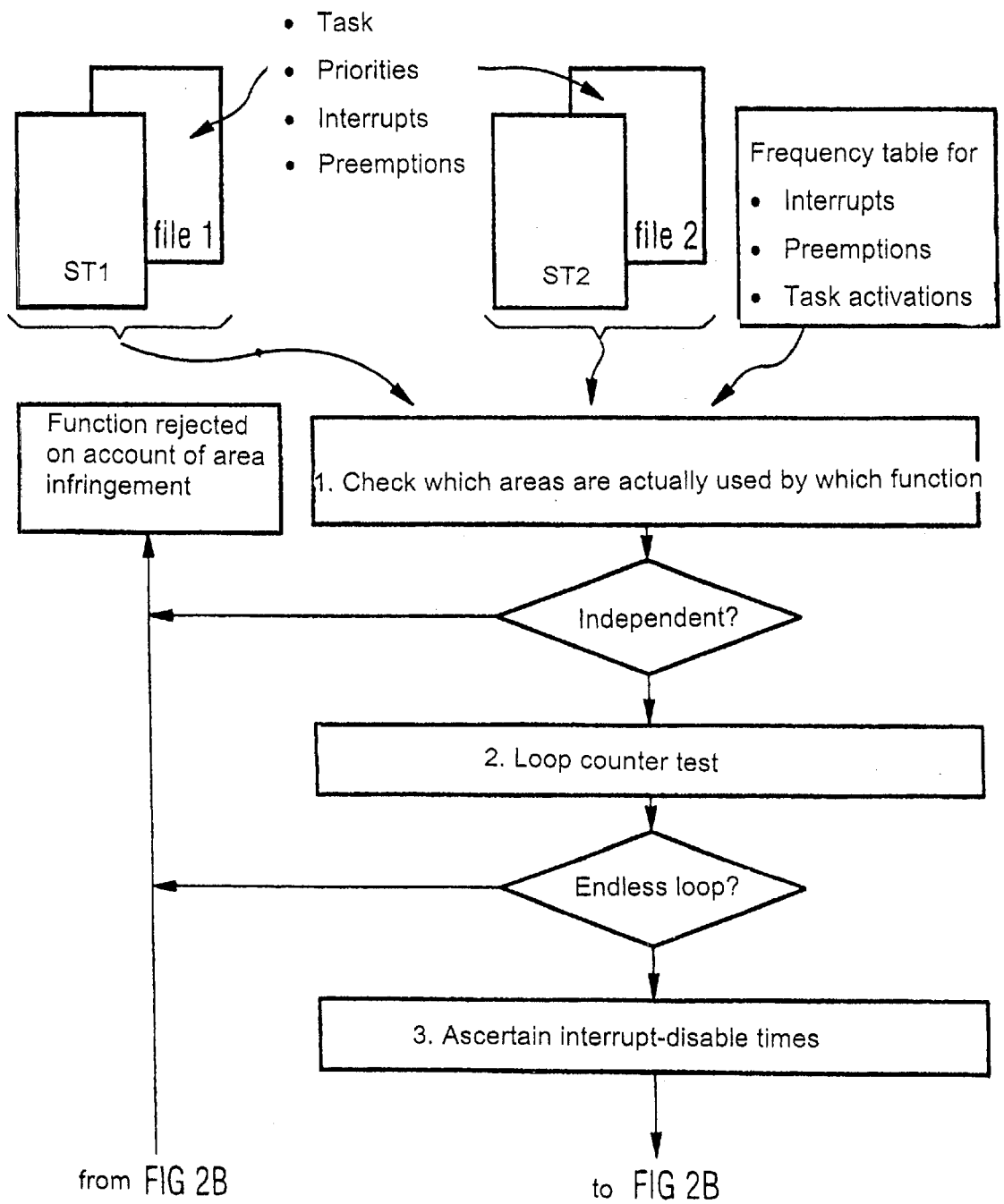
FIGS. 2A and 2B collectively show a flowchart for a preferred embodiment of the method according to the invention.
Figure 2B:
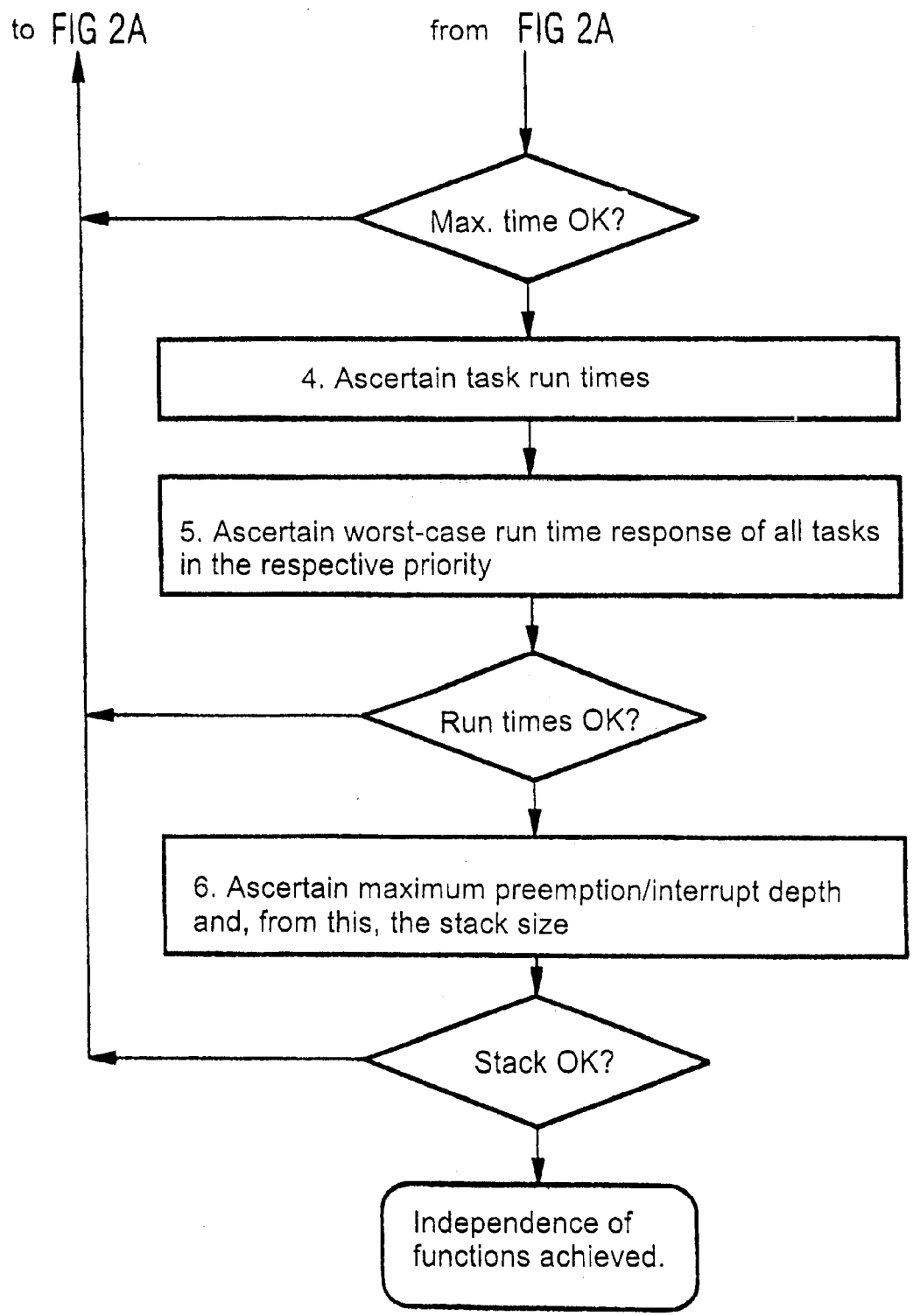

As shown in FIG. 2, the individual functions are first available as software tasks ST1 and ST2 (software modules). Before the functions can be integrated into the controller STG, their mutual compatibility and independence must be demonstrated. To accomplish the integration, all cases of mutual influencing are now preferably identified as follows:

In a first method step 1, the software module to be tested is searched for object code sequences (machine code sequences) that would show write access to unauthorized areas.

In a second method step 2, the loops and their loop counters for the software modules to be tested are identified. The way in which these counters are manipulated within the loops and whether or not these counters have a static limit at the start of the loop are ascertained. Hence, the maximum number of loop passes is ascertained.

In a further method step 3, the object code is searched for object code sequences (machine code sequences) manipulating interrupt-enable/disable operations. The interrupt-disable times are ascertained, in the form of the intermediate object code cycles (machine code cycles), from the object code.

In addition, in a further method step 4, the maximum run time for individual software modules (for example, OSEK tasks) is ascertained, in the form of object code cycles (machine code cycles), from the object code.

In a method step 5, the frequency of the interrupts, of the task calls and of the messages per defined unit of time (for example, per engine revolution in the case of an engine controller) and the priorities of the tasks and of the messages and of the authorized preemptions are presented to the tool (for example by input). The presentation allows, for example, methods of ascertaining the software run time and the message latency time to be used.

In parallel, the information is used to ascertain the maximum interrupt and preemption depth so that the size of the required stack can be ascertained (method step 6).

After the method has been carried out, it is clear whether or not the undisclosed sections of the software modules are influencing other software modules. It is also clear whether or not the respective software module has sufficient resources (RAM, ROM, run time) available.

The clarity automatically ensures that the technical functions implemented by the software influence one another exclusively at the disclosed interfaces, that is to say, that they are compatible with one another. Additional monitoring complexity is not required. The checking is preferably carried out by a further processor configuration, likewise under software control.

I claim:

1. A method of analyzing the ability of software modules, each executing particular functions, in a device to cooperate using machine code sequences contained in executing software modules, which comprises:

searching software modules for machine code sequences containing write access to unauthorized areas;

ascertaining a respective maximum number of loop passes for each loop and establishing whether or not the respective maximum number of loop passes is limited; and determining that the software modules are able to cooperate upon observing at least one reference value, and otherwise determining that the software modules are not able to cooperate.

2. The method according to claim 1, which comprises searching the software modules for sequences in which unauthorized interrupt-enable/disable operations are carried out, and, if the reference values are observed, determining that the software modules are able to cooperate, and, if the reference values are not observed, determining that the software modules are not able to cooperate.

3. The method according to claim 1, which comprises ascertaining interrupt-disable times and comparing the interrupt-disable times with respectively appropriate reference values, and, if the reference values are observed, determining that the software modules are able to cooperate, and, if the reference values are not observed, determining that the software modules are not able to cooperate.

4. The method according to claim 3, wherein the ascertaining interrupt-disable times step comprises ascertaining the interrupt-disable times by searching the software modules for machine code sequences manipulating interrupt-enable/disable code, and determining times between each of these machine code sequences.

5. The method according to claim 1, which comprises ascertaining a maximum run time of the individual executing software modules and comparing the maximum run time of the individual executing software modules with respectively appropriate reference values, and, if the reference values are observed, determining that the software modules are able to cooperate, and, if the reference values are not observed, determining that the software modules are not able to cooperate.

6. The method according to claim 5, wherein the ascertaining a maximum run time step comprises ascertaining the maximum run time of the individual executing software modules using a number of machine cycles.

7. The method according to claim 1, which comprises ascertaining a total run time and a message latency time and comparing the total run time and the message latency time with respectively appropriate reference values, and, if the reference values are observed, determining that the software modules are able to cooperate, and, if the reference values are not observed, determining that the software modules are not able to cooperate.

8. The method according to claim 7, wherein the ascertaining a total run time and a message latency time step comprises ascertaining the total run time and the message latency time by determining a frequency of interrupts, task calls, and messages per defined unit of time, and establishing priorities for the tasks, the messages, and permitted preemptions.

9. The method according to claim 1, which comprises ascertaining a maximum interrupt and preemption depth and comparing the maximum interrupt and preemption depth with respectively appropriate reference values, and, if the reference values are observed, determining that the software modules are able to cooperate, and, if the reference values are not observed, determining that the software modules are not able to cooperate.

10. The method according to claim 9, wherein the ascertaining a maximum interrupt and preemption depth step comprises ascertaining the maximum interrupt and preemption depth by determining a frequency of interrupts, task calls, and messages per defined unit of time, and establishing priorities for the tasks, the messages, and permitted preemptions.

11. The method according to claim 10, which comprises ascertaining a size of a required stack from the maximum interrupt and preemption depth.

12. The method according to claim 1, wherein the ascertaining step comprises ascertaining the number of loop passes by:

identifying the loops and their associated loop counters;

establishing how the counters are manipulated; and establishing whether or not the counters each have a static limit at the start of the loop.

13. The method according to claim 1, which comprises examining the software modules to determine whether or not machine code sequences are executed directly from a direct access memory.

* * * * *